US012628007B2

(12) United States Patent
Vanduyn et al.

(10) Patent No.: US 12,628,007 B2
(45) Date of Patent: May 12, 2026

(54) ENHANCED NETWORK RELIABILITY AND/OR BOOSTED NETWORK SPEED

(71) Applicant: DISH Network L.L.C., Englewood, CO (US)

(72) Inventors: Luke Vanduyn, Conifer, CO (US); Caroline Condon, Denver, CO (US); William Michael Beals, Englewood, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 393 days.

(21) Appl. No.: 17/535,765

(22) Filed: Nov. 26, 2021

(65) Prior Publication Data

US 2023/0171620 A1 Jun. 1, 2023

(51) Int. Cl.
| | |
|---|---|
| *H04W 24/04* | (2009.01) |
| *H04W 4/80* | (2018.01) |
| *H04W 40/12* | (2009.01) |
| *H04W 88/16* | (2009.01) |

(52) U.S. Cl.
CPC ............. *H04W 24/04* (2013.01); *H04W 4/80* (2018.02); *H04W 40/12* (2013.01); *H04W 88/16* (2013.01)

(58) Field of Classification Search
CPC ....... H04W 24/04; H04W 4/80; H04W 40/12; H04W 88/16
USPC ....................................................... 370/225
See application file for complete search history.

(56) References Cited

U.S. PATENT DOCUMENTS

| | | | | |
|---|---|---|---|---|
| 9,307,508 B2 * | 4/2016 | Daley | .................... | H04H 20/38 |
| 2004/0243840 A1 * | 12/2004 | Tran | ........................ | H04L 67/30 726/2 |
| 2007/0192495 A1 * | 8/2007 | Marais | ................... | H04L 67/04 709/227 |
| 2011/0125925 A1 * | 5/2011 | Bouthemy | .............. | H04L 69/40 709/250 |
| 2011/0153721 A1 * | 6/2011 | Agarwal | ................. | H04L 69/04 709/227 |

(Continued)

FOREIGN PATENT DOCUMENTS

| | | | | | |
|---|---|---|---|---|---|
| CN | 108270689 A | * | 7/2018 | .......... | H04L 47/125 |
| CN | 117014835 A | * | 11/2023 | | |

(Continued)

*Primary Examiner* — Nicholas A Jensen
*Assistant Examiner* — Oladiran Gideon Olaleye
(74) *Attorney, Agent, or Firm* — Seed Intellectual Property Law Group LLP

(57) ABSTRACT

Various embodiments of apparatuses, systems (e.g., a gateway device) and/or methods are described for correcting failover or latency issues of a network connection. In this disclosure, a gateway device determines whether a first connection between the gateway device and a first wide area network has a network outage. Network latency is determined for the first connection between the gateway device and the first wide area network, and such network latency is compared with a predefined threshold. In response to the network latency being above the predefined threshold or in response to determining that there is the network outage, a second wide area network is used via a computing device to create a second connection between the end devices and the second wide area network, and data is sent between the end devices using the second connection.

12 Claims, 8 Drawing Sheets

(56) References Cited

U.S. PATENT DOCUMENTS

| | | | | |
|---|---|---|---|---|
| 2012/0052857 A1* | 3/2012 | Kumar | ................. | H04W 24/08 |
| | | | | 455/466 |
| 2013/0114481 A1* | 5/2013 | Kim | .................... | H04W 28/02 |
| | | | | 709/219 |
| 2015/0333965 A1* | 11/2015 | Lee | ...................... | H04W 84/12 |
| | | | | 370/254 |
| 2017/0142654 A1* | 5/2017 | Mclaughlin | .......... | H04W 76/19 |
| 2018/0091382 A1* | 3/2018 | Dronadula | ............. | H04L 43/04 |
| 2020/0396509 A1* | 12/2020 | Livoti | ................... | H04N 21/24 |
| 2021/0282035 A1* | 9/2021 | Hiscock | ............. | H04W 52/028 |
| 2022/0311481 A1* | 9/2022 | Jiao | ...................... | H04W 48/02 |

FOREIGN PATENT DOCUMENTS

| | | | | | |
|---|---|---|---|---|---|
| JP | 2006094277 | A | * | 4/2006 | |
| WO | WO-2020176038 | A1 | * | 9/2020 | ........ H04L 12/2854 |

* cited by examiner

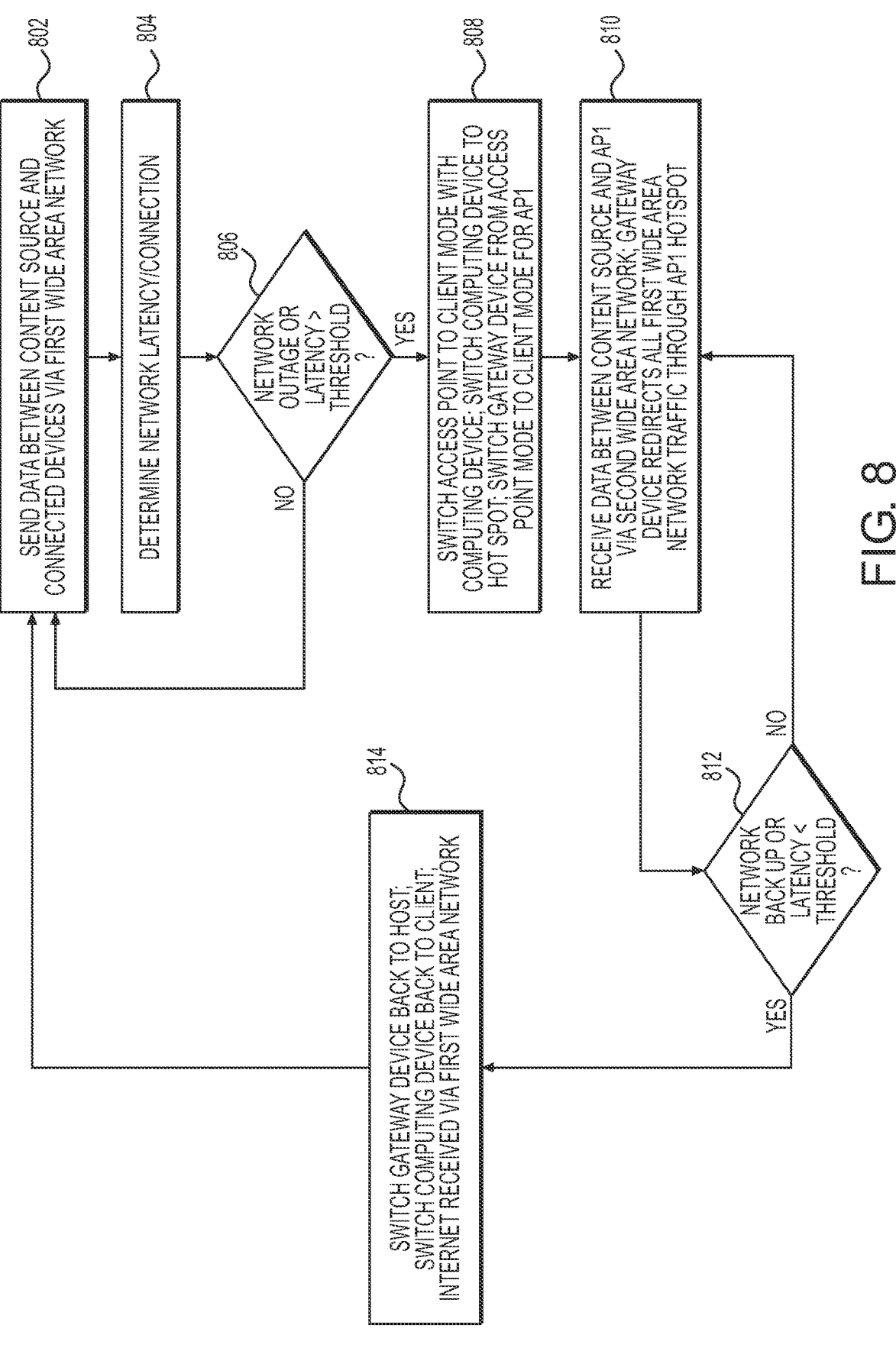

802 — SEND DATA BETWEEN CONTENT SOURCE AND CONNECTED DEVICES VIA FIRST WIDE AREA NETWORK

804 — DETERMINE NETWORK LATENCY/CONNECTION

806 — NETWORK OUTAGE OR LATENCY > THRESHOLD ?

808 — SWITCH ACCESS POINT TO CLIENT MODE WITH COMPUTING DEVICE; SWITCH COMPUTING DEVICE TO HOT SPOT; SWITCH GATEWAY DEVICE FROM ACCESS POINT MODE TO CLIENT MODE FOR AP1

810 — RECEIVE DATA BETWEEN CONTENT SOURCE AND AP1 VIA SECOND WIDE AREA NETWORK; GATEWAY DEVICE REDIRECTS ALL FIRST WIDE AREA NETWORK TRAFFIC THROUGH AP1 HOTSPOT

812 — NETWORK BACK UP OR LATENCY < THRESHOLD ?

814 — SWITCH GATEWAY DEVICE BACK TO HOST, SWITCH COMPUTING DEVICE BACK TO CLIENT; INTERNET RECEIVED VIA FIRST WIDE AREA NETWORK

FIG. 8

ENHANCED NETWORK RELIABILITY AND/OR BOOSTED NETWORK SPEED

BACKGROUND

Currently, receiving internet at users' devices has become a mainstay in our personal lives and for our business careers.

However, this internet connection sometimes has latency issues, especially through internet communication via high Earth orbit geostationary satellites, which may be the only connection available in rural or underserved areas. The latency of satellite internet is due to the great distance and the finite propagation speed of electromagnetic signals between a transceiver on Earth and the satellite. This latency can be significantly increased for various reasons, such as poor visibility, loss of line of sight communications, poor weather conditions, etc.

Another frustration that users currently have with their internet access is that the user's primary internet connection sometimes fails. The user will then not have internet access until the internet connection is back up.

Finally, during times of heavy usage, such as when multiple members of the household are doing bandwidth-intensive activities simultaneously, the user's home internet connection may not be fast enough to support all activities at once.

SUMMARY

Some embodiments described herein generally provide apparatuses, systems and methods to create, using a short range connection to pair a computing device to a gateway device and then the computing device distributes internet it receives through its connection with a wide area network (WAN) using a temporary redundant connection with the gateway device. This redundant connection will help mitigate the problem stated above and eliminate intermittent network loss.

Additionally, other various embodiments described herein generally provide apparatus, systems and methods to configure a local area network (LAN) gateway device to change an existing client device on the LAN to be a temporary hotspot using the client device's Wi-Fi radio, and the LAN gateway device then would redirect all WAN traffic for the LAN through the repurposed client in hotspot mode.

Various embodiments of apparatuses, systems (e.g., a gateway device) and/or methods are described for network speed and reliability boost. A gateway device, which connects end devices and a first wide area network, determines whether a first connection between the gateway device and the first wide area network has a network outage. The gateway device determines network latency for the first connection between the gateway device and the first wide area network. The network latency is compared with a predefined threshold. In response to the network latency being above the predefined threshold or in response to determining that there is the network outage, a second wide area network is used via a computing device to create a second connection between the end devices and the second wide area network. Data is sent between the end devices via the second connection.

According to one embodiment, a system includes: a gateway device that connects end devices and a first wide area network, and a plurality of access points that comprises a first access point comprising a radio. The gateway device is configured for determining, by the gateway device, that a network outage has occurred between the gateway device and the first wide area network; and in response to the network outage occurring, setting a radio for the first access point from access point mode to client mode. The first access point is configured for, in response to the radio associated with the first access point being set to client mode, transmitting data between the second wide area network to the gateway device which forwards the transmissions to the end devices.

According to one embodiment, a gateway device that connects end devices and a first wide area network; and a plurality of end devices that comprises a first end device and the plurality of end devices. The gateway device is configured for determining network latency for a first connection between the gateway device and the first wide area network; comparing the network latency with a predefined threshold; in response to the network latency being above the predefined threshold, requesting data transfers using a second wide area network through the first end device to create a second connection between the end devices and the second wide area network; and sending data between both the first and second connections to reduce the network latency.

BRIEF DESCRIPTION OF THE DRAWINGS

The same number represents the same element or same type of element in all drawings.

FIG. 8 illustrates a method for enhanced network reliability and/or boosted network speed according to some embodiments.

DETAILED DESCRIPTION OF EMBODIMENTS

The various embodiments described herein generally provide apparatus, systems and methods to increase network reliability and/or boost network speed.

Temporary Redundant Network Connection

Intermittent network outages or latency issues can cause major issues when, for example, in an important online meeting or attempting to conduct a file transfer. Generally, in at least one embodiment, a quick solution to this problem that requires no setup of a physical connection is provided. For example, generally, a gateway device could contain an NFC tag. When the user places their computing device (e.g., a cell phone) on top of the gateway device, the NFC tag instructs the computing device on how to share its internet connection with the gateway device via short-range communication protocol (such as mobile hotspot or Bluetooth tethering). The gateway device uses bandwidth stacking to combine this connection with its previously available connections to create a temporary, faster connection. The gateway device could also combine the new connection in failover mode to create a redundant connection. This redundant connection will help mitigate the problem stated above and eliminate intermittent network loss.

These and other embodiments will be described in more detail below with regard to FIGS. 1-4.

Figure 1:
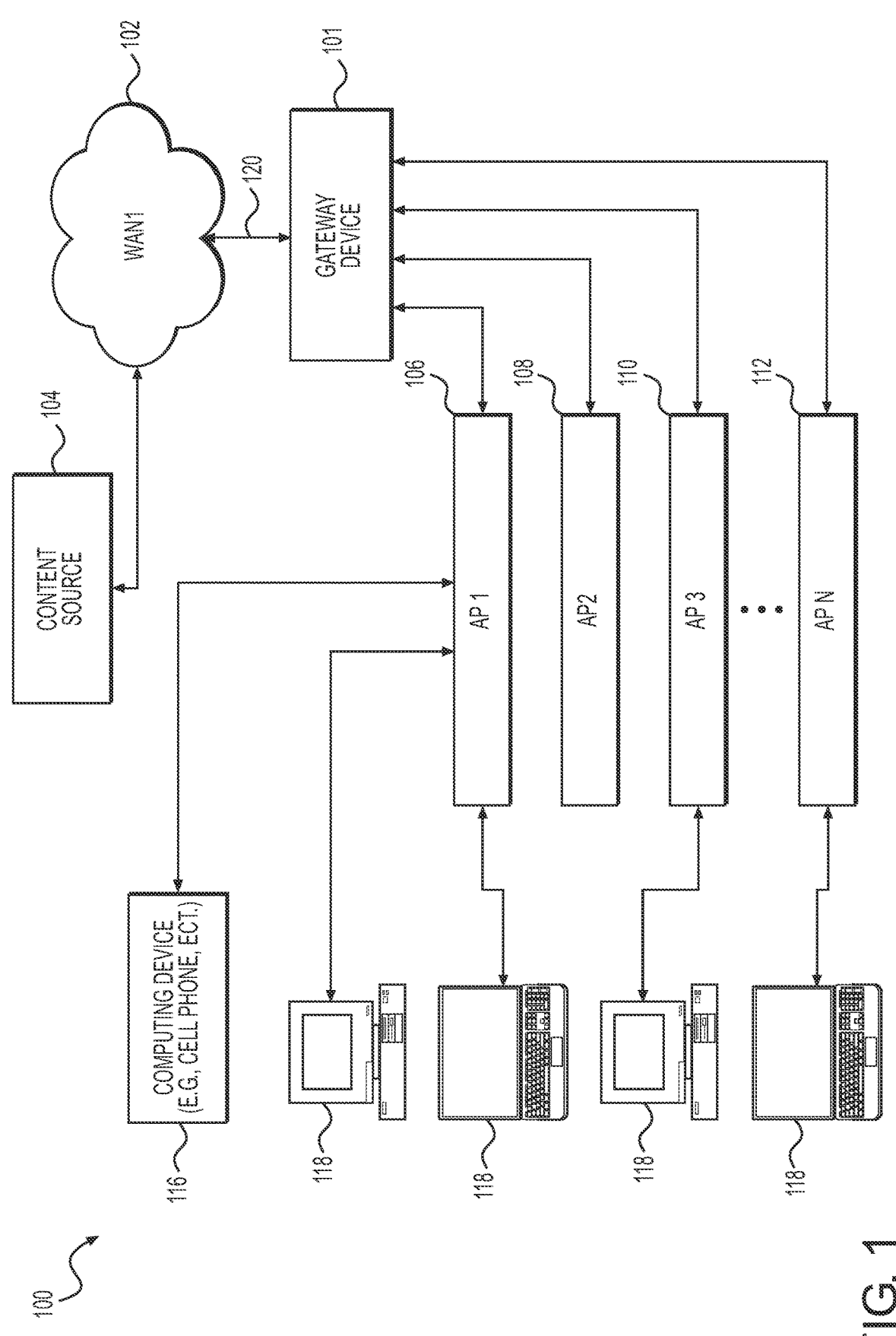
FIG. 1 illustrates an embodiment of a system for network for data communications.

Starting first with FIG. 1, FIG. 1 illustrates an embodiment of a system 100 for network for data communications. The system 100 includes a gateway device 101, a first wide area network (WAN1) 102 and access points (AP) 106,108, 110,112. These devices are discussed in more detail below.

WAN1 102 is a system that delivers over wired lines or wirelessly internet to the gateway device 101 and the gateway device 101 then, in turn, provides this internet to various connected devices 118 (which includes computing device 116), in at least one embodiment. In some embodiments, this is done using a number (N) of access points, such as AP 1 106, AP 2 108, AP 3 110 to AP N 112, where each access point is configured to communicate with the gateway device 101 to perform internet communications with the connected devices 118 connected to such access points.

WAN1 102 may comprise any type of communication network utilized between the gateway device 101 and the content provider 104. Exemplary communication networks include internet distribution networks (e.g., satellite and cable internet networks), wireless communication networks, public switched telephone networks (PSTN), and local area networks (LAN) or wide area networks (WAN) providing data communication services. WAN1 102 may utilize any desired combination of wired (e.g., cable and fiber) and/or wireless (e.g., cellular, satellite, microwave, and radio frequency) communication mediums and any desired network topology (or topologies when multiple mediums are utilized). The gateway device 101 may communicate with the WAN1 102 through a wired or wireless connection 120. WAN1 102 may distribute data signals in digital or analog form to the gateway device 101.

The system 100 of FIG. 1 also includes a series of access points 106, 108, 110, 112 that are connected to a single gateway device 101 and may also include connected devices 118 which connect directly to one of the access points 106, 108, 110, 112 or to the gateway device 101. FIG. 1 shows a number N of access points 106, 108, 110, 112 (i.e., access points 1 to N). Each of the access points 106, 108, 110, 112 includes a Wi-Fi radio transceiver (also referred to herein as a "radio") that (1) transmits and receives data to/from the gateway device 101, and (2) connects to any connected device 118 that uses the internet, such as computers, phones, laptops, tablet, and any other device that uses the internet. It should be understood that any of the access points 106, 108, 110, 112 can connect to any number of the connected devices 118.

The gateway device 101 may be configured to receive content from one or more content sources 104 via WAN1 102. In at least one embodiment, the gateway device 101 is a wireless router. In another embodiment, the gateway device 101 is a satellite or cable internet converter box combined with a router so that signals are received from an internet provider (via Satellite, Data Over Cable Service Interface Specification (DOC SIS), etc.), the signals are converted for use by the router, and the router then routes the signals to the access points 106, 108, 110, 112 and the connected devices 118 in accordance with embodiments of the present application. It is to be appreciated that the gateway device 101 may also be embodied as an apparatus combining the functionalities of one or more of: a router, display device, a set-top box, DVR, and/or an internet converter box.

The gateway device 101 is communicatively coupled to the access points 106, 108, 110, 112 and/or connected devices 118 through any type of wired or wireless connection. Exemplary wired connections include Ethernet wiring, and exemplary wireless connections include Wi-Fi and Bluetooth.

The gateway device 101 is discussed in more depth below with regard to FIG. 3.

A content source 104 delivers data to a presentation device (which could be one of the connected devices 118), via the gateway device 101. The content source 104 may comprise any system or apparatus configured to provide presentation data, such as a video stream and audio stream, to the presentation device. Exemplary content sources include television distribution systems, such as over the air distribution systems, cable television distribution systems, satellite television distribution systems, broadband distribution systems and the like.

Figure 2:
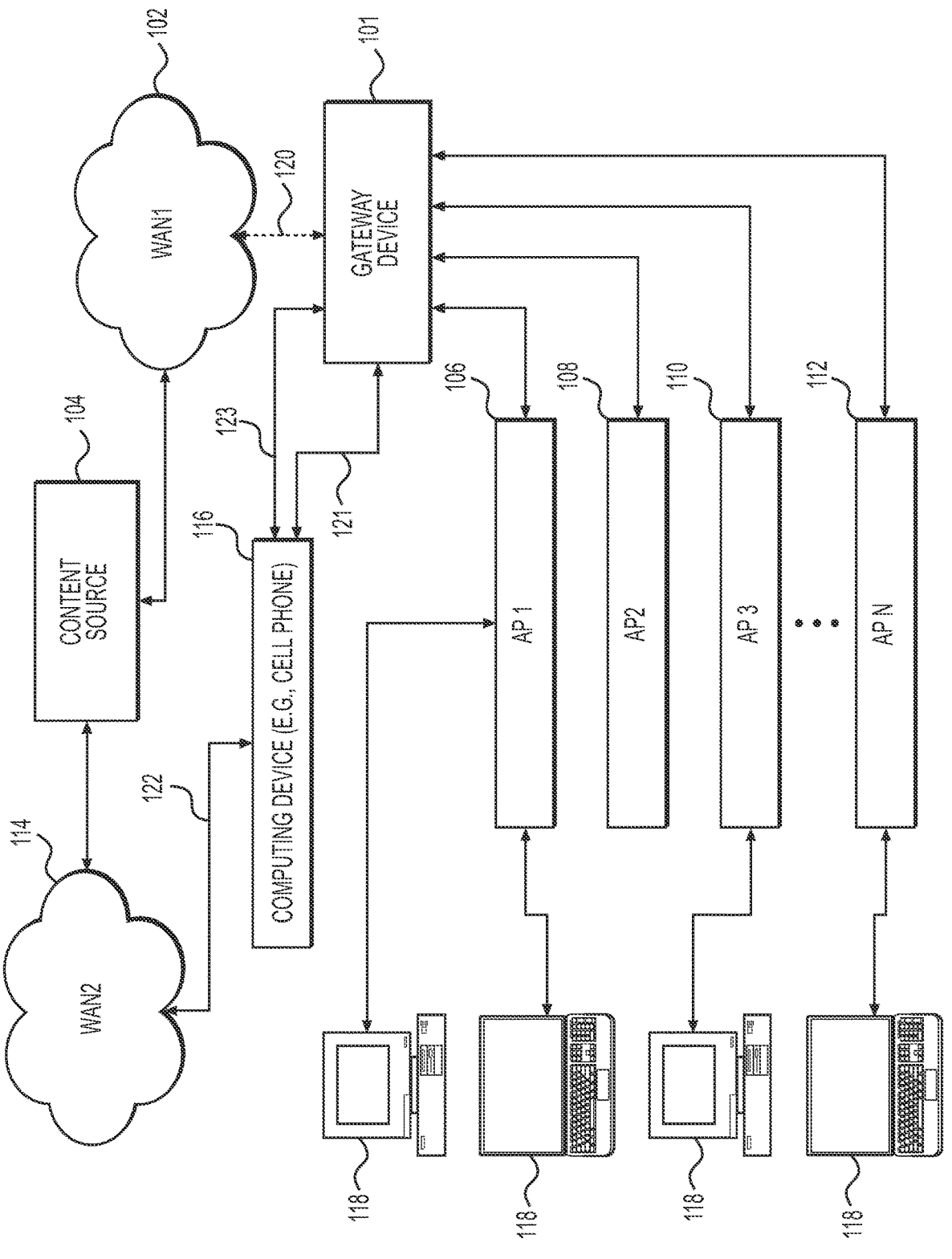
FIG. 2 illustrates an embodiment of a system for enhanced network reliability and/or boosted network speed.

FIG. 2 illustrates an embodiment of a system for enhanced network reliability and/or boosted network speed. FIG. 2 is the same system as FIG. 1 (in some embodiments) but also includes computing device 116 that is connected with a second wide area network (WAN2) 114 via connection 122. The computing device 116 is connected with gateway 101 when there are latency issues or a network outage and the computing device 116 is placed proximate to the gateway device 101 (or another device (not shown) acting as an extension of the gateway device 101).

The computing device 116 connects to WAN2 via connection 122 which may be a different type of connection relative to connection 120 in at least one embodiment. For example, connection 120 may be a satellite connection while connection 122 may be a cellular connection from a cellular phone. It should be understood that connections 120 and 122 can be any connection and should not be limited.

As shown in FIG. 2, the gateway device 101 pairs with the computing device 116 using a short range connection 123, such as near field communication (NFC). For example, a cellular phone may be placed on top of or next to the gateway device 101 (router) and the connection 123 may automatically be established between the cellular phone and gateway device 101. In this example, the cellular phone can be placed within a certain predetermined distance of the gateway device 101, such as within two inches for NFC.

When the computing device 116 is placed within the predetermined distance of the gateway device 101, the gateway device 101 detects such placement and automatically connects to the computing device 116 according to at least one embodiment. The computing device 116 is configured to operate as a "hot spot" (which is a wireless local area network (WLAN) set up by the computing device 116 where users can access the Internet via such WLAN) automatically in response to the gateway device 101 connecting to the computing device 116, in some embodiments. In these embodiments, when the computing device 116 is placed within the predetermined distance of the gateway device 101, the computing device 116 automatically switches on the computing device's hot spot in order to connect the gateway device 101 to WAN2, according to some embodiments. In some embodiments, the computing device 116 is detected by an NFC connection at the gateway device 101 and then the computing device 116 is configured to allow access to one of the access points 106, 108, 110, 112 to the connection 122 to WAN2 114 that is within range of the computing device 116 or the gateway device 116. In this regard, the computing device 116 acts as the internet gateway for providing internet ultimately through to the connected devices 118 via either an access point or the gateway device 101 acting as a client device. In some embodiments, connection 123 (e.g., an NFC connection) is used to only connect the computing device 116 to the client device (e.g., gateway device 101 or one of the access points 106, 108, 110, 112) and the computing device 116 then connects via a different connection (e.g., Wi-Fi, etc.) to such client device in order to distribute the internet from WAN2 114 to the connected devices 118 through the client device. In this regard, once the computing device 116 is paired with the client device, the connection 123 is no longer needed and can be disconnected. In one embodiment, this connection 123 may occur at a time before any network connectivity issues or latency issues so that when such issues arise, the redundant connection 121 of the computing device can be automatically established. In another embodiment, the connection 123 may occur in response to detecting any network connectivity issues or latency issues so that when such issues arise, the pairing connection 123 of the computing device can be established (automatically or manually in response to a request), pairing of the computing device 116 and the client device occurs, and then the redundant connection 121 is established.

It is noted that, when the computing device 116 is acting as a hot spot, the client device is referred to below and in FIGS. 2-4 as the gateway device 101, but as mentioned above, this could instead be one of the access points 106, 108, 110, 112 that is within range of the computing device and the present invention should not be limited to which device is acting as the client device.

The gateway device 101 (or one of the access points 106, 108, 110, 112 that is within range) can connect automatically to the computing device 116 when the hot spot broadcast of the computing device 116 is issued. If the hot spot broadcast requires a password, the gateway device 101 (or the access points 106, 108, 110, 112) could store such password so that the gateway device 101 (or the access points 106, 108, 110, 112) can automatically be authenticated to the computing device 116 creating connection 123.

It should be noted that the present application refers to the "hot spot" of the computing device 116 for ease of reference and illustration, but the present application should not be limited and the "hot spot" could instead be any network broadcast by the computing device, including any local area network.

Regardless, the gateway device 101 (or one of the access points 106, 108, 110, 112) will recognize the hot spot broadcast and automatically connect to the computing device 116 and thus, WAN2 114 without interaction from the user, according to at least one embodiment. In one embodiment, the gateway device 101 can present to the user's computing device 116 a notice informing the user that network connectivity is down or poor and (1) that the computing device's hot spot is being used as a redundant connection; (2) a notice informing the user that network connectivity is down or poor and a request to use the computing device's hot spot as a redundant connection; and/or include other notices or requests, according to some embodiments. If a request is provided to the user to connect the gateway device 101 to the computing device 116, the user can then accept or decline such request.

Last, in FIG. 2, the computing device 116 is configured to receive data from the same content source 104 via WAN2 than gateway device 101 does via WAN1. In one embodiment, this is because both WAN1 and WAN2 are internet-based networks and content source 104 connects to the internet.

Figure 3:
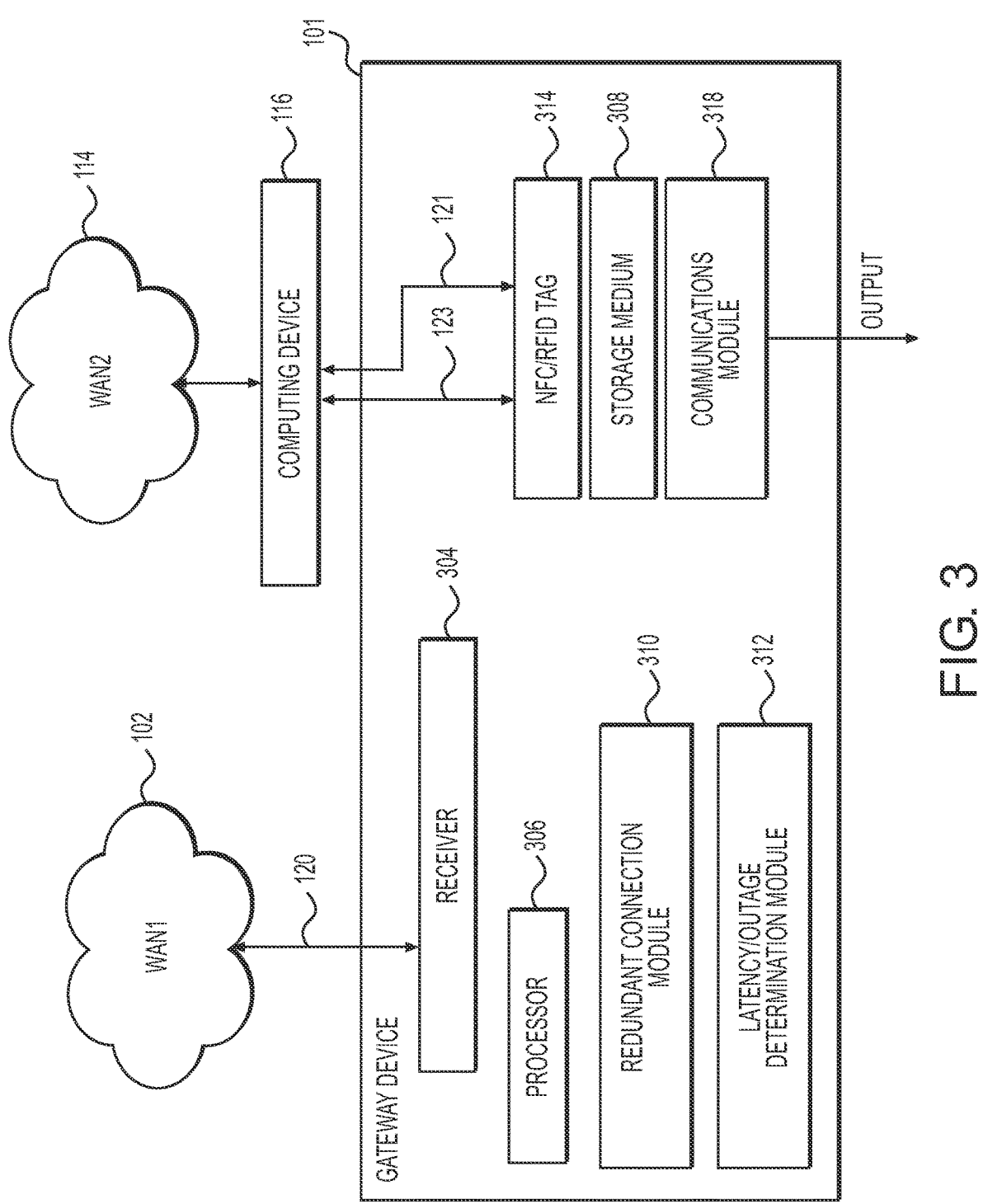
FIG. 3 illustrates an embodiment of a gateway device of the embodiment of FIG. 2.

FIG. 3 illustrates an embodiment of the gateway device 101 of FIG. 2. The gateway device 101 comprises a receiver 304, a processor 306, a storage medium 308, a redundant connection module 310, a latency/outage determination module 312, an NFC/RFID tag 314, and a communications module 318. Each of these components is discussed in greater detail below.

The gateway device 101 receives the internet feed at the receiver 304 from WAN1 102. The receiver 304 is a port on the gateway device 101 that receives data signals from a wired or wireless connection via WAN1 102. These signals are then processed by the processor 306 and software in the gateway device 101 to effectively receive the internet signals from WAN1 102 so that they can be delivered to the connected devices 118 and/or access points 106-112.

The NFC/RFID tag 314 is a short range wireless device that can use radio waves to transmit data from the NFC/RFID tag 314 to a reader. The NFC/RFID tag 314 can be a passive tag that can respond to a request to the NFC/RFID tag 314 from the reader where the request energizes the NFC/RFID tag 314 and requests data stored in the NFC/RFID tag 314. Alternatively, the NFC/RFID tag 314 can be active tag that can always be broadcasting the data stored in the NFC/RFID tag 314 for reading by a reader within range. Regardless, a response from the NFC/RFID tag 314 travels a short distance (e.g., within one inch, two inches, three inches, etc. to several feet) to get to the reader in response to a reader inquiry. As such, in this invention, the NFC/RFID tag 314 can be implemented into the gateway device 101 (e.g., on the top of the device) or in an extension device (not shown) that is electrically connected to the gateway device 101. In this regard, a user can place the computing device 116 physically within a predetermined distance within the NFC/RFID tag 314 embedded physically in the gateway device or the extension device so that the computing device 116 can receive data from the NFC/RFID tag 314. The data in the NFC/RFID tag 314 can be information to allow automatic connection between the computing device 116 and the gateway device 101. In another embodiment, the gateway device 101 (or extension device) could have the reader embedded therein and the computing device include the NFC/RFID tag 314. In this embodiment, the computing device 116 can transmit data relating to its hot spot SSID and password information to allow for automatic connection to the hot spot.

The processor 306 may be a hardware processor (e.g., CPU) that is configured to execute instructions stored in storage medium 308. The processor 306 is configured to interact with each of the modules 310, 318 and stored data and other software and/or data stored in the storage medium 308. For example, the processor 306 is configured to perform at least one or more or all of the steps presented herein, including those shown in FIG. 4.

Any of the modules 310, 318 and other software modules or data may be stored in the storage medium 308. For example, the predetermined latency threshold may be stored on the storage medium 308. The storage medium 308 may be any type of temporary or persistent storage device capable of storing instructions and data. The storage medium 308 may be internal and/or external to the gateway device 101 and may include one or more storage devices. For example, the storage medium 308 may be an internal hard drive or flash memory.

The latency/outage determination module 312 is a software module with instructions that are executed by the processor to continuously monitor latency and for network outages. The latency/outage determination module 312 accesses the storage medium 308 to determine a predetermined latency threshold, above which indicates that latency is too high and the redundant connection is needed. In this regard, the latency/outage determination module 312 compares the latency of the connection 120 between gateway device 101 and WAN1 102 with the predetermined latency threshold and returns the comparison to the latency/outage determination module 312. The latency/outage determination module 312 also determines whether a network outage has occurred if there is a lack of data received at connection 120 for greater than a predefined time period.

The latency/outage determination module 312 provides this information to the redundant connection module 310 in order to determine whether a redundant connection needs to be established or not, and if so sending a notification accordingly.

The redundant connection module 310 is configured to establish the connection 121 between the computing device 116 and the gateway device 101, in one embodiment. Specifically, the redundant connection module 310 has instructions that, when executed by the processor 306, performs one or more of the steps of FIG. 4. The redundant connection module 310 is configured to handle internet requests received from access points 106, 108, 110, 112 (or directly from connected devices 118). The redundant connection module 310 is configured to then send these requests to either WAN1 or WAN2 depending on the higher bandwidth and/or lowest latency. In one embodiment, the redundant connection module 310 uses bandwidth stacking to increase bandwidth speed.

The communications module 318 communicates with the latency/outage determination module 312 and the redundant connection module 316 to deliver internet bandwidth to the access points 106, 108, 110, 112 and/or connected devices 118. This may be done wirelessly over a short range network, such as Wi-Fi or Bluetooth, or via a wired connection.

As mentioned above, the computing device 116 can connect and provide internet communications through one of the access points 106, 108, 110, 112 instead of the gateway device 101. In this regard, each of the access points 106, 108, 110, 112 may include features similar to those shown in FIG. 3 for the gateway device 101, such as a processor, a redundant connection module, a latency outage determination module, a storage medium and a communications module. For example, while the computing device 116 is broadcasting a network as a hot spot, the access point 106, 108, 110, 112 that is connected as a client device to the computing device 116 may have a redundant connection module which is configured to establish a connection (not shown in FIG. 2) between computing device 116 and one of the access points 106, 108, 110, 112.

Figure 4:
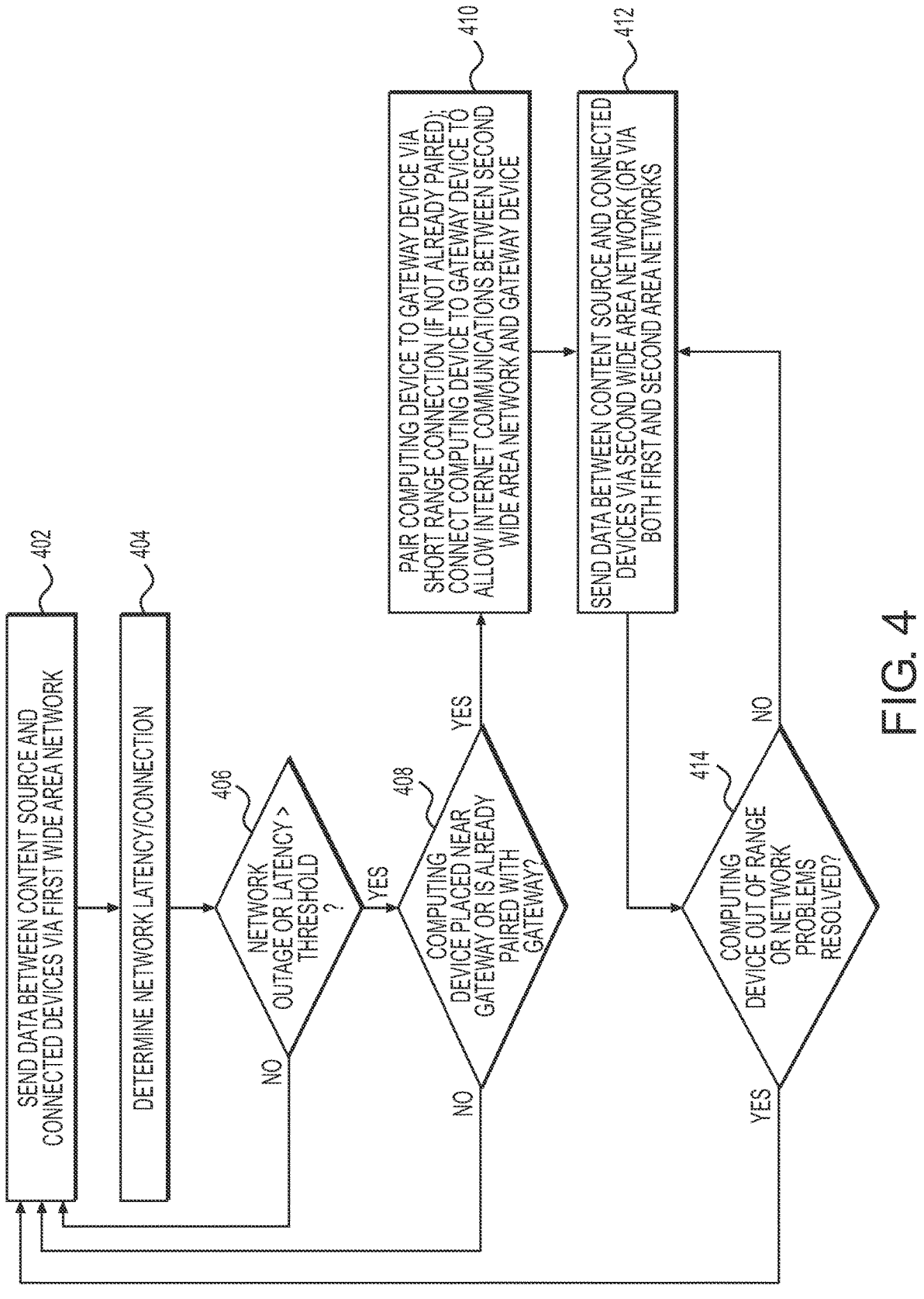
FIG. 4 illustrates a method for enhanced network reliability and/or boosted network speed according to some embodiments.

FIG. 4 illustrates a method of enhancing network reliability and boosting internet speed according to some embodiments. Starting first in block 402, the gateway device 101 transfers data from the content source 104 to connected devices 118 and/or access points 106, 108, 110, 112 via WAN1 102.

At block 404, the gateway device 101 determines the network latency and network connection quality. In addition to what is mentioned above with regard to FIG. 3, the network latency is determined by the gateway device 101 "pinging" the WAN1 102 from gateway device 101. This is done on a periodic basis to give a real time current latency value on a continuous basis. Moreover, in this pinging process, the gateway device 101 determines if WAN1 102 has an outage or otherwise the connection between the gateway device 101 and WAN1 102 has failed so that data is not able to be sent over connection 120.

In decision block 406, the gateway device 101 performs one or more tasks: (1) determining whether there is a network outage, and/or (2) if the latency determined in block 404 is greater than a predetermined threshold. The predetermined threshold may be set by a user or a manufacturer, but this predetermined threshold is a factor in determining the quality of the network connection. A high latency value indicates significant lag because of the delay in receiving data from transmission to reception. Thus, the system determines if the latency is greater than the predetermined threshold which would indicate that the connection quality is worse than what is desired.

If the latency is less than or equal to the predetermined threshold under the determination of decision block 406, the method may proceed back to block 402 where data is continued to be transferred by gateway device 101 via only WAN1 102.

On the other hand, if the latency is higher than the predetermined threshold or the system otherwise determines there is a network outage based on the determination of decision block 406, then the method proceeds to decision block 408 where the system determines whether or not the computing device 116 has been placed within a predetermined distance of the gateway device 101, such as NFC/RFID tag 314. This determination can be performed by the gateway device 101 receiving signals indicating the presence of the computing device's hot spot network. Such signals could include the hot spot SSID announcing the presence of the hot spot network. If the computing device 116 is not detected within range of the NFC/RFID tag 314, the method may proceed to block 402 where data is continued to be sent via WAN1 102.

In decision block 408, if the gateway device 101 determines that the computing device 116 has been placed proximate to or is already paired with the gateway device 101, the computing device 116 connects to the computing device's hot spot network as provided in block 410. To pair the gateway device 101 and computing device 116 together, in one embodiment, the computing device 116 queries the NFC/RFID tag 314 of the gateway device 101. The NFC/RFID tag 314 of the gateway device 101 then will respond to the query. Also data can be written to the NFC/RFID tag 314 using the gateway device 101. The SSID and the password of the hot spot network can be shared in this process so that the gateway device 101 can automatically connect to the hot spot network of the computing device 116 when within a predetermined distance of the hot spot.

In one embodiment for block 410, the gateway device 101 can automatically connect to the computing device 116 without the computing device 116 having to be placed within the predetermined distance of the gateway device 101. This is possible as NFC can be used in this embodiment for pairing only and the actual data connection to the client device (e.g., gateway device 101 or one of the access points 106, 108, 110, 112) can be any other protocol such as Wi-Fi, which is longer range. In this embodiment, the computing device 116 is automatically connected to the client device (e.g., gateway device 101 or one of the access points 106, 108, 110, 112) via Wi-Fi, for example, since in this embodiment the computing device has been previously paired with the client device (e.g., gateway device 101 or one of the access points 106, 108, 110, 112).

In this regard, the computing device 116 may have already been paired with the gateway device 101 before there are any network issues (e.g., outages, latency issues, connection issues, etc.). As such, the computing device 116 may automatically connect to the gateway device 101 anytime the computing device 116 is within short range of the gateway device 101 since it has already been paired with the gateway device 101. Accordingly, the gateway device 101 could start using the redundant connection 121 using the hot spot of the computing device 116 automatically in response to detection of network issues.

Once the gateway device 101 has connected to the hot spot of the computing device 116, the gateway device 101 is authenticated to the hot spot network of the computing device 116 creating connection 121 (or a connection with another client device (e.g., one of the access points 106, 108, 110, 112)). At that point, in block 412, data can be sent between the content source 104 and the connected devices 118 and access points 106, 108, 110, 112 via both of WAN1 102 and WAN2 114 simultaneously, which boosts network speeds. As mentioned above, the gateway device 101 is configured to send internet requests from the access points 106, 108, 110, 112 and/or connected devices 118 to either or both WAN1 102 or WAN2 114 depending on the higher bandwidth and/or lowest latency. In one embodiment, the gateway device 101 uses bandwidth stacking to increase bandwidth speed of the combined WAN1 102 and WAN2 114.

In some embodiments, the gateway device 101 (or another device that determines whether an outage has occurred) can also route traffic smartly through the two connections 120 and 121, according to predefined or user-defined Quality over Server (QOS) settings. For example, if the problem is that the first connection 120 has gone down entirely, all the traffic needs to be sent through the second connection 121, as explained above.

On the other hand, if the problem is that the first connection 120 has very high latency (i.e., the latency is greater than the predetermined threshold), the gateway device 101 is configured to identify certain bandwidth usage applications (e.g., streaming video content, downloading data, etc.) and continue to send such certain bandwidth usage applications over the high-latency connection, while keeping the lower latency connection free for more latency-sensitive applications, like a video conferencing application, according to at least one embodiment. In this regard, the system (or user) can determine certain applications where latency is critical for proper operation and dedicate those latency critical applications for the connections that have lower latency. In any event, data can be sent and shared along both connections 120 and 121 at the same time in order to lower latency issues of the overall bandwidth of the system.

At block 414, it is determined whether the computing device is out of range from the gateway device 101 (or other client device (e.g., one of the access points 106, 108, 110, 112)) because the computing device 116 has moved more than the predetermined distance away from the gateway device 101 thereby causing the connection 121 between the gateway device 101 and the computing device 116 to fail or otherwise be disconnected. If so, the method continues back to block 402 to only allow communications between the gateway device 101 and WAN1 102 via connection 120; otherwise, the method may return to block 412 where both WAN1 102 and WAN2 114 are continued to be used to communicate data.

In one embodiment where NFC is used for initial pairing of the computing device 116, the computing device 116 may stay connected to the client device (e.g., gateway device 101 or other client device (e.g., one of the access points 106, 108, 110, 112) until the computing device 116 is out of Wi-Fi range from the client device.

Also at block 414, if the WAN1 102 problems are resolved (e.g., latency is less than the predefined threshold, network connection working, etc.), the gateway device 101 may be removed from the computing device's hot spot network by disconnecting the connection 121 between the gateway device 101 and the computing device 116. In one embodiment, the connection 121 may continue (e.g., for a predefined amount of time, for an amount of time without a certain number of network problems arising, etc.) even if the network problems with WAN1 102 have been restored.

The above methods discussed above have been explained with the gateway device 101 performing the steps of FIG. 4 but the present invention should not be so limited and instead the gateway device 101 may perform one or more of the functions of FIG. 4 and one or more functions of FIG. 4 may be performed using a cloud server (not shown) or other computer locally connected with the gateway device 101.

It should also be noted that the present invention should not be limited to requiring all of the elements of FIG. 3 or all of the steps of FIG. 4. For example, the gateway device 101 may not require that an NFC/RFID tag 314 be implemented and instead the present application includes embodiments where the gateway device 101 connects to the computing device 116 in other short range wireless communications, such as via Bluetooth, infrared, Wi-Fi, ultraband and Zigbee or via a longer range connection if the computing device is already paired with the client device (e.g., gateway device 101, access point 106, 108, 110, 112, etc.).

Access Point/Gateway Device Switch

Below is a discussion of other embodiments of enhancing network reliability and boosting network speed. In some embodiments, generally, an access point 106 is switched to be a hot spot when there is failover in the main connection 120 between the gateway device 101 and WAN1 102.

As background, many gateways today have multiple Wi-Fi radios for LAN access. In the event of a WAN network failure, a gateway device cannot provide internet access to LAN clients.

According to some embodiments, one alternative would be for the gateway to connect to a user's computing device (e.g., cell phone) as a client to get internet access via the computing device, treating that computing device as the main WAN connection during the main WAN network outage. This will provide the entire home with internet access via the computing device without needing to reconfigure each device.

Because most gateways have multiple Wi-Fi radios, it is feasible to repurpose one of them just for a failover condition. A given radio likely can support either host mode or client mode, so if repurposed, could not be used to support LAN clients. If the radio can support both modes simultaneously, then none of the connected devices will be affected. In the failover mode, the user would enable the hotspot mode on their computing device and then configure the gateway device to enable client mode instead of AP mode for that Wi-Fi radio. The gateway device then would redirect all WAN traffic for all connected devices through the computing device in hotspot mode.

These and other embodiments will be described in more detail below with regard to FIGS. 5-8.

Figure 5:
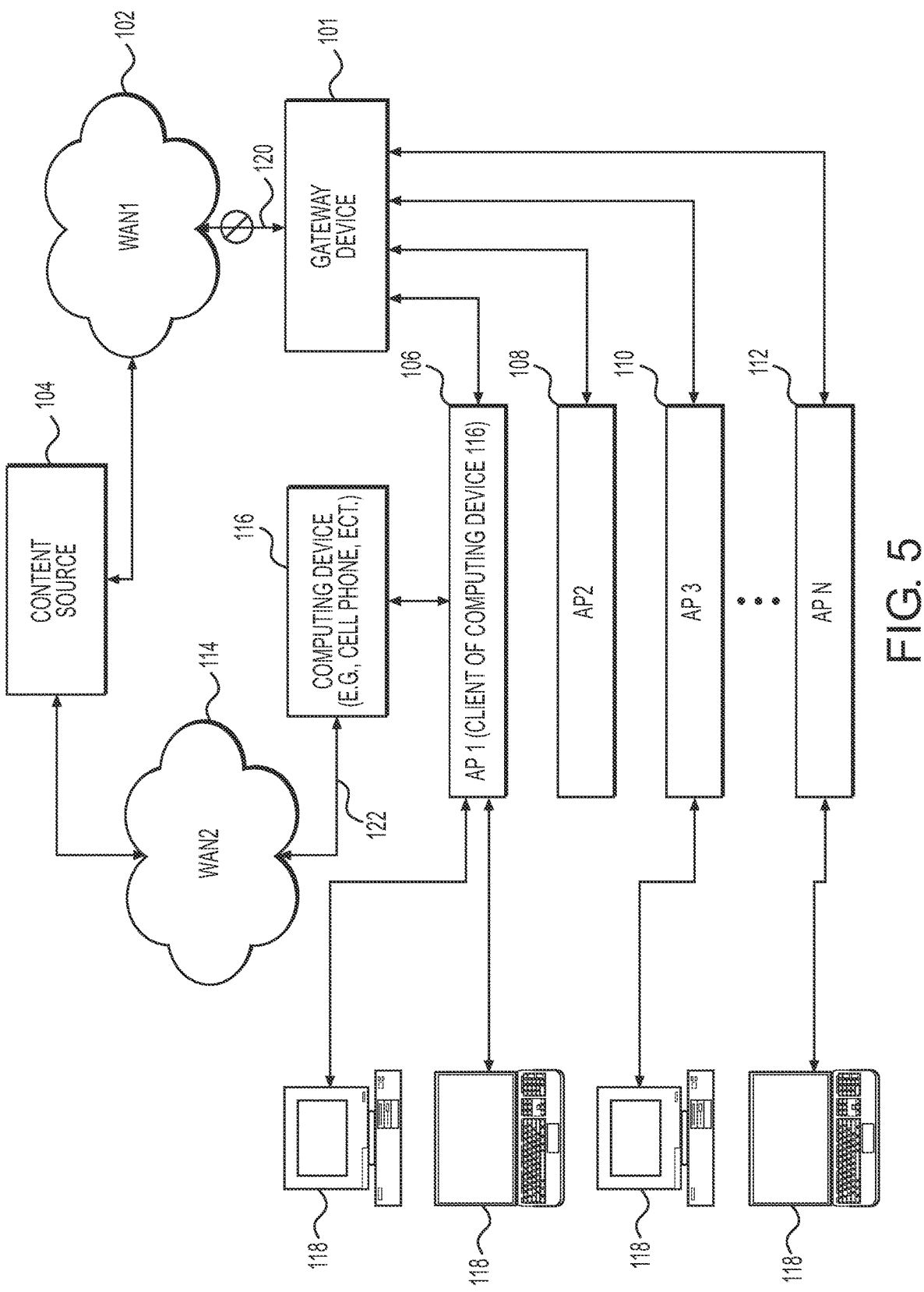
FIG. 5 illustrates embodiments of a system for enhanced network reliability and/or boosted network speed.

FIG. 5 illustrates embodiments of a system for enhanced network reliability and/or boosted network speed when there are latency issues or a network outage. FIG. 5 is the same system as FIG. 1 (in some embodiments) but also includes the ability of the AP1 106 to receive internet from the computing device 116 (instead of gateway device 101) so that acts as the network host with WAN2 114 when there are latency issues or a network outage. FIG. 5 will be discussed at the same time with regard to the following paragraphs.

As shown overlaying connection 120 of FIG. 5, there is a block symbol (a circle with a slash through it) which is meant to represent that there are significant latency issues or a network outage with connection 120. In this regard, there are either connectivity issues or a network outage between WAN1 102 and gateway device 101.

As mentioned above, computing device 116 is configured to connect to WAN2 114 via a connection 122 which may be a different type of connection relative to connection 120 in at least one embodiment. For example, connection 120 may be a satellite connection while connection 122 may be a cellular connection from a cellular phone. It should be understood that connections 120 and 122 can be any connection and should not be limited.

In at least one embodiment, AP1 106 is an access point device that includes a Wi-Fi radio to send/receive Wi-Fi signals and the computing device 116 has a cellular antenna to connect to WAN2 114. In an embodiment, AP1 106 has (1) a first client mode where it can receive internet from a gateway device 101, and (2) a second client mode where AP1 106 is a client of the computing device 116 so that it receives internet from the computing device 116 and sends out traffic similar to a gateway in order to provide other devices with internet. AP1 106 in FIG. 1 shows AP1 106 in the first client mode (AP1 106 is a client of gateway device 101) while FIG. 5 shows AP1 106 in hot spot mode (AP1 106 is a client of computing device 116).

FIG. 5 illustrates that the access points 108-112 connect with the gateway device 101 directly to receive internet. In each of the access points, there is a corresponding node in the gateway device 101. For example, AP1 106, AP2 108, AP3 110, and AP4 112 have corresponding radios on the gateway device including radio 1, radio 2, radio 3, and radio 4, respectively. In this regard, radio 1 corresponds to AP1 106, radio 2 corresponds to AP2 108, radio 3 corresponds to AP3 110, and radio 4 corresponds to AP4 112. Each radio for the gateway device can be placed in host mode (where the gateway is the host of the internet for such access point) or in client mode (where the gateway is the receiver of interview from the access point).

In the example shown in FIG. 5, radio 1 corresponding to AP1 106 is set to client mode in the gateway device 101, radio 2 corresponding to AP2 108 is set to host mode in the gateway device 101, radio 3 corresponding to AP3 110 is set to host mode in the gateway device 101, and radio 4 corresponding to AP4 112 is set to host mode in the gateway device 101. In this regard, AP2 108, AP3 110, and AP4 112 are all set to receive internet from the gateway device 101, but the gateway device 101 is set to receive internet content from sources (e.g., the content source 104) via WAN2 through AP1 106 because gateway 101 has the radio set to be "client mode" for AP1 106.

In another embodiment, when there is a failover of connection 120 and the computing device 116 is converted to a hot spot, AP1 106 can have a dual role in that AP1 106 is both: (1) a client of the computing device 116 in the second client mode to receive internet via the computing device 116, and (2) a host to the connected devices 118 connected to AP1 106 (e.g., FIG. 5 illustrates two connected devices 118 connected to AP1 106) so that the devices 118 connected to AP1 106 are provided internet through AP1 106.

Figure 6:
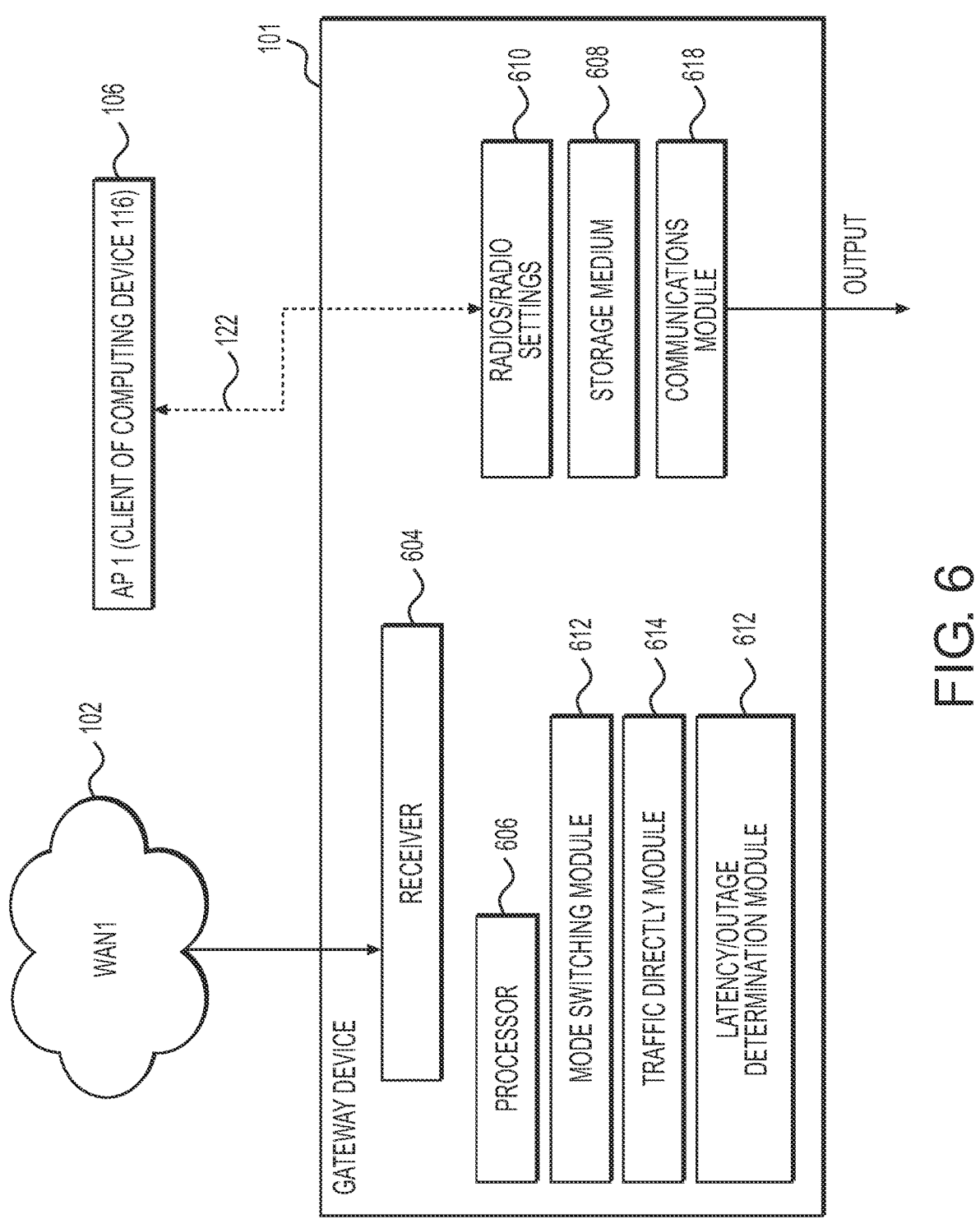
FIG. 6 illustrates an embodiment of a gateway device of the embodiments of FIG. 5.

FIG. 6 illustrates an embodiment of a gateway device of the embodiments of FIG. 5. The gateway device 101 of FIG. 6 comprises a receiver 604, a processor 606, a storage medium 608, a radio/radio settings 610, a mode switching module 612, traffic redirection module 614, a latency/outage determination module 616, and a communications module 618. Each of these components is discussed in greater detail below.

The gateway device 101 receives the internet feed at the receiver 604 from WAN1 102. The receiver 604 is a port on the gateway device 101 that receives data signals from a wired or wireless connection via WAN1 102. These signals are then processed by the processor and software in the gateway device 101 to effectively receive the internet signals from WAN1 102 so that they can be delivered to the connected devices 118 and/or access points 106-112.

The processor 606 may be a hardware processor (e.g., CPU) that is configured to execute instructions stored in storage medium 608. The processor 606 is configured to interact with each of the modules 612, 614, 618 and stored data and other software and/or data stored in the storage medium 608. For example, the processor 606 is configured to perform at least one or more or all of the steps presented herein, including those shown in FIG. 8.

Any of the modules 612, 614, 618 and other software modules or data may be stored in the storage medium 608. For example, the predetermined latency threshold may be stored on the storage medium 608. The storage medium 608 may be any type of temporary or persistent storage device capable of storing instructions and data. The storage medium 608 may be internal and/or external to the gateway device 101 and may include one or more storage devices. For example, the storage medium 608 may be an internal hard drive or flash memory.

The latency/outage determination module 612 is a software module with instructions that are executed by the processor to continuously monitor latency and for network outages. The latency/outage determination module 612 accesses the storage medium 608 to determine a predetermined latency threshold, above which indicates that latency is too high and the redundant connection is needed. In this regard, the latency/outage determination module 612 compares the latency of the connection 120 between gateway device 101 and WAN1 102 with the predetermined latency threshold and returns the comparison to the latency/outage determination module 612. The latency/outage determination module 612 also determines whether a network outage has occurred if there is a lack of data received at connection 120 for greater than a predefined time period.

The latency/outage determination module 612 provides this information to the mode switching module 612 in order to determine whether one of the gateway radios 610 (i.e., radio 1 in the above example) needs to be switched to client mode for AP1 106 or not, and if so sending a notification accordingly.

As previously mentioned, the radios 610 of the gateway device 101 are set to provide what mode each access mode has at the gateway device 101—either the access point will provide its data to the gateway device 101 or will receive data from the gateway device 101. The radios each have settings 610 which allow the modes to be stored for each access point access. The radio/settings 610 are stored in the storage medium 608.

The mode switching module 612 is configured to establish that the gateway device 101 will receive data from the connection 122 of AP1 106 with WAN2 114 and that this connection 122 allows WAN2 114 to be the WAN for all connected devices 118 and access points 108, 110,112. Generally, the mode switching module 612 has instructions that, when executed by the processor 306, performs block 808 of FIG. 8. Specifically, the mode switching module 612 is configured to switch the mode radio setting 610 of the radio 610 of gateway device 101 that is associated with AP1 106 from host mode to client mode in response to detecting latency issues or a network outage. The mode switching module 612 is configured to then notify the user of such switch in radio mode setting 610.

Upon making such switch, the traffic redirection module 614 handles all requests coming into the gateway device 101 and redirects such requests through the radio having "client mode" assigned thereto, which in the above example would be AP1 106. In this regard, all internet requests from the access points 108, 110, 112 and connected devices 118 that send requests for data packets have those requests automatically forwarded to AP1 106 because the radio associated with AP1 106 is set to client mode in the above embodiment. Of course, there could be multiple access points with client mode and the bandwidths of each of the connected WANs could be combined and stacked to boost network speed according to some embodiments, and the present invention need not be limited to only one radio setting being client mode setting.

The communications module 618 communicates with the latency/outage determination module 612 and the traffic redirection module 614 to deliver internet bandwidth to the access points 108-112 and/or connected devices 118. This may be done wirelessly over a short range network, such as Wi-Fi or Bluetooth, or via a wired connection.

Figure 7:
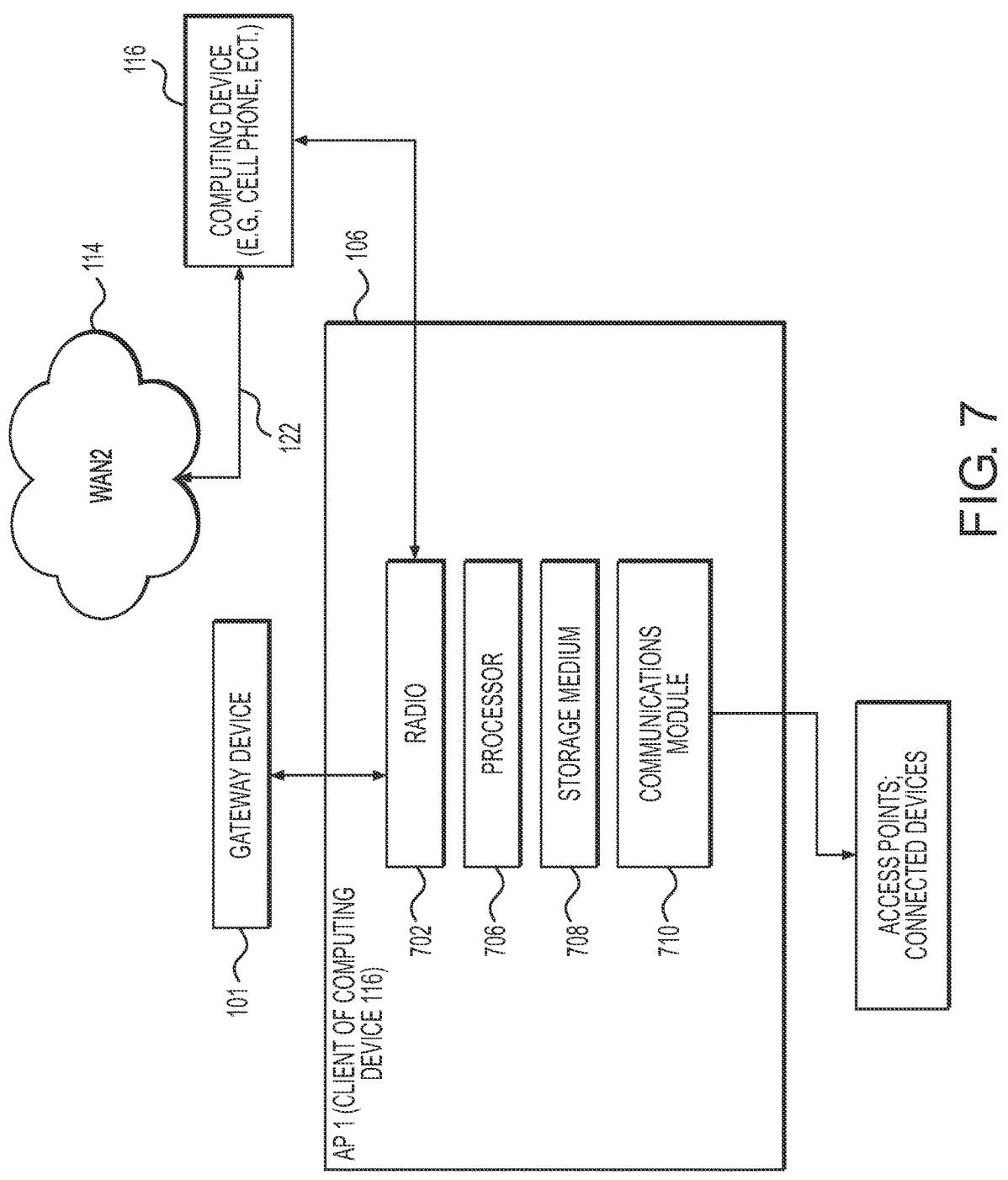
FIG. 7 illustrates an embodiment of a first access point of the embodiments of FIG. 5.

FIG. 7 illustrates an embodiment of AP1 106 of the embodiments of FIG. 5 where there is failover. The AP1 106 of FIG. 7 comprises a radio 702, a processor 706, a storage medium 708, and a communications module 710. Each of these components is discussed in greater detail below.

The AP1 106 receives the internet feed at the radio 702 through computing device 116 during failover of connection 120 but receives internet from gateway device 101 via WAN1 102 when the radio for AP1 106 at the gateway device 101 is set to be an access point with the gateway device 101. The radio 702 is a Wi-Fi radio that receives data signals from a wireless connection with the computing device during failover of connection 120. These signals are then processed by the processor 706 and software in the AP1 106 to effectively receive the internet signals from WAN2 114 through the computing device 116.

The processor 706 may be a hardware processor (e.g., CPU) that is configured to execute instructions stored in storage medium 708. The processor 706 is configured to interact with each of the modules 710 and stored data and other software and/or data stored in the storage medium 708. For example, the processor 706 is configured to perform at least one or more or all of the steps presented herein, including block 810 shown in FIG. 8.

Any of the modules 710 and other software modules or data may be stored in the storage medium 708. For example, the predetermined latency threshold may be stored on the storage medium 708. The storage medium 708 may be any type of temporary or persistent storage device capable of storing instructions and data. The storage medium 708 may be internal and/or external to the gateway device 101 and may include one or more storage devices. For example, the storage medium 708 may be an internal hard drive or flash memory.

The communications module 710 communicates with radio 702 connected with computing device 116 to deliver internet bandwidth to the gateway device 101 and potentially other devices such as the access points 108, 110, 112 and/or connected devices 118, as explained above with regard to FIG. 5. This may be done wirelessly over a short range network, such as Wi-Fi or Bluetooth.

FIG. 8 illustrates a method for enhanced network reliability and/or boosted network speed according to some embodiments. Starting first in block 802, data is sent between the content source 104 and connected devices 118 and access points 106, 108, 110, 112 through WAN1 102.

At block 804, the gateway device 101 determines the network latency and network connection quality. As mentioned above with regard to FIG. 4, the network latency is determined by the gateway device 101 pinging the WAN1 102 from gateway device 101. This is continually done to give a real time current latency value. Moreover, in this pinging process, the gateway device 101 determines if WAN1 102 has an outage or otherwise the connection between the gateway device 101 and WAN1 102 has failed so that data is not able to be sent over connection 120.

In decision block 806, the gateway device 101 performs one or more tasks: (1) determining whether there is a network outage, and/or (2) if the latency determined in block 804 is greater than a predetermined threshold. The predetermined threshold may be set by a user or a manufacturer, but this predetermined threshold is a factor in determining the quality of the network connection. A high latency value indicates a lot of lag because of the delay in receiving data from transmission to reception. Thus, the system determines if the latency is greater than the predetermined threshold which would indicate that the connection quality is worse than what is desired.

If the latency is less than or equal to the predetermined threshold under the determination of decision block 806, the method may proceed back to block 802 where data is continued to be sent via WAN1 102.

On the other hand, if the latency is higher than the predetermined threshold or the system determines there is a network outage under the determination of decision block 806, then the method proceeds to decision block 808 where the AP1 106 is switched from host mode to client mode. Additionally, the gateway device 101 sends a command to the computing device 116 to enter hot spot mode and, in response, the computing device 116 then enters hot spot mode.

In block 810, the data is received between the content source 104 and AP1 106 via WAN2 114, and because the gateway device 101 is in client mode, the gateway device 101 redirects all traffic of the connected devices 118 through the AP1 106 while AP1 106 is in hot spot mode.

In decision block 812, there is a determination as to whether the network is back up or if the latency is less than the threshold. This determination is made by the gateway which continuously checks the WAN1 102 connection (even though all regular traffic is through AP1 during failover) to determine when it is functioning normally again to know to swap back to WAN1.

If it is determined that the network is not back up and latency is greater than the threshold in block 812, then the method may proceed back to block 810 to continue receiving internet via computing device 116 acting as a hot spot.

On the other hand, if it is determined that the network is back up or latency is less than the threshold in block 812, then the method may proceed back to block 814 where the connection 120 with WAN1 102 and the gateway device 101 is re-established, and the gateway device 101 is switched back to host mode to receive internet through WAN1 102. In this regard, the computing device 116 is switched from hot spot mode to client mode so that it is no longer a hot spot, and AP1 106 is switched back to host mode. At this point, the system will operate back normally similar to that shown in FIG. 1.

The above process under FIG. 8 is described as a manual one, in one embodiment, but the present invention should not be so limited. Instead, it could be optionally automated depending on the gateway device 101 and cell phone features. The process would also work with a "regular" dedicated hotspot device.

The above methods and systems provide an advantage of data usage and bandwidth for critical functions of connected devices so that at a minimum, these critical functions/devices operate even in rural areas, poor weather conditions or other situations where bandwidth is limited and also in situations where data package caps make wise usage of data needed.

Although specific embodiments were described herein, the scope of the invention is not limited to those specific embodiments. The scope of the invention is defined by the following claims and any equivalents therein.

The terminology used herein is for the purpose of describing particular embodiments only and is not intended to be a limiting of embodiments of the disclosure. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present disclosure has been presented for purposes of illustration and description, but is not intended to be exhaustive or limited to embodiments of the disclosure in the form explicitly disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A method comprising:

enabling, by a gateway device that connects end devices to a first wide area network, a near field communication (NFC) tag contained in the gateway device to transmit data, wherein the data instructs a computing device on how to share information with the gateway device regarding a wireless local area network (WLAN) of the computing device;

establishing, by the gateway device, a NFC connection with the computing device, wherein the gateway device establishes the NFC connection with the computing device in response to placement of the gateway device and the computing device within a predetermined distance of each other, wherein the computing device is connected to the internet using a second wide area network, including:

transmitting, by the gateway device via the NFC tag, the data that instructs the computing device on how to share the information with the gateway device regarding the WLAN of the computing device;

obtaining, by the gateway device and using the NFC connection, the information for the WLAN of the computing device, the information including an identifier and a password for the WLAN of the computing device; and storing, by the gateway device, the identifier and the password for the WLAN of the computing device;

terminating the NFC connection between the gateway device and the computing device;

after terminating the NFC connection, determining, by the gateway device, that a first connection between the gateway device and the first wide area network has a network outage or that a network latency for the first connection is greater than a predefined threshold;

in response to determining that the network latency is greater than the predefined threshold or in response to determining that there is the network outage:

using, by the gateway device, the identifier and the password to access the WLAN of the computing device;

automatically sending, by the gateway device, a request to the computing device via the WLAN for a user of the computing device to accept or decline use of a second connection between the gateway device and the computing device as a redundant connection by the gateway device; and sending information to the computing device indicating that network connectivity over the first wide area network is degraded; and in response to the user accepting the request to use the second connection, providing internet access to the end devices so that the end devices receive internet via the second wide area network from the computing device; and in response to the user declining the request to the use of the second connection, refraining from providing the internet access to the end devices via the second wide area network from the computing device.

2. The method of claim 1, further comprising pairing the computing device with the gateway device using the NFC connection prior to sending the request, wherein the NFC connection is different from the second connection.

3. The method of claim 2, further comprising: automatically establishing the NFC connection between the computing device and the gateway device when the computing device is placed within a predetermined distance from the gateway device; and automatically performing the requesting after establishing the NFC connection.

4. The method of claim 3, wherein the first connection is determined to have the network outage, and wherein the computing device comprises a first end device of the end devices, and the gateway device requests the first end device to act as a second gateway device between the end devices and the second wide area network.

5. The method of claim 4, wherein the first end device comprises an access point and a radio of the access point is used as a transmitter to transmit data between the second wide area network and the gateway device.

6. The method of claim 5, further comprising:

determining a data threshold that is less than a reserve data package; and in response to current data usage within a recurring period being greater than or equal to the data threshold, disabling non-critical functions once the data threshold is met for a recurring period while allowing data communications with critical functions.

7. The method of claim 1, further comprising:

after the second connection is established and data is transmitted to the end devices using the second connection, determining that there is no longer the network outage for the first connection; and transmitting data using the first connection so that the second connection does not transmit data between the end devices and the second wide area network.

8. The method of claim 1, further comprising:

prior to establishing the second connection between the end devices and the second wide area network, transmitting data between a content source and the end devices using the first connection; and after the second connection is established between the end devices and the second wide area network, only transmitting data between the end devices and the content source using the second connection.

9. A system comprising:

a plurality of end devices; and a gateway device that connects the plurality of end devices to a first wide area network and that has a first connection to the first wide area network, wherein the plurality of end devices comprising a computing device that has a second connection to the internet via a second wide area network, the gateway device including:

a near field communication (NFC) tag that transmits data to the computing device, wherein the data instructs the computing device on how to share information with the gateway device regarding a wireless local area network (WLAN) of the computing device; and wherein the gateway device is configured for:

receiving a query from the computing device;

in response to receiving the query, establishing a near field communication (NFC) connection with the computing device, wherein the gateway device establishes the NFC connection with the computing device in response to placement of the gateway device and the computing device within a predetermined distance of each other, including:

transmitting, via the NFC tag, the data that instructs the computing device on how to share the information with the gateway device regarding the WLAN of the computing device;

obtaining, using the NFC connection, the information for the WLAN of the computing device, the information including a password for the WLAN of the computing device; and storing the password for the WLAN of the computing device;

terminating the NFC connection with the computing device;

sending internet data between the gateway device and each of the plurality of end devices via the first connection between the gateway device and the first wide area network;

after terminating the NFC connection, determining network latency for the first connection is greater than a predefined threshold;

in response to determining that the network latency is greater than the predefined threshold:

using, by the gateway device, the password to access the WLAN of the computing device;

automatically sending, by the gateway device, a request to the computing device via the WLAN for a user of the computing device to accept or decline use of the second connection by the gateway device; and sending information to the computing device indicating that network connectivity over the first wide area network is degraded; and in response to the user accepting the request to use the second connection, providing internet access to the end devices over the second connection between the computing device and the second wide area network, so that internet data communications is trafficked using both the first and second connections to reduce the network latency; and in response to the user declining the request to the use of the second connection, refraining from providing the internet access to the end devices via the second wide area network from the computing device.

10. The system of claim 9, wherein the gateway device is configured for:

requesting the computing device to act as a second gateway device, wherein the second connection and first connection both transmit data to and from the end devices.

11. The system of claim 9, wherein the gateway device is configured for:

adding bandwidths of the first connection and the second connection.

12. The system of claim 9, wherein the gateway device is configured for:

bandwidth stacking of the first connection and the second connection.

\* \* \* \* \*